United States Patent [19]
Lobley et al.

[11] Patent Number: 5,844,817
[45] Date of Patent: Dec. 1, 1998

[54] DECISION SUPPORT SYSTEM, METHOD AND ARTICLE OF MANUFACTURE

[75] Inventors: Donald J. Lobley, Baie d'Urfe; Edward S. Robins, Montréal, both of Canada

[73] Assignee: Arlington Software Corporation, Montreal, Canada

[21] Appl. No.: 525,064

[22] Filed: Sep. 8, 1995

[51] Int. Cl.[6] .................................................. G06F 15/00
[52] U.S. Cl. ............................... 364/578; 395/50; 395/75
[58] Field of Search ............................. 364/578; 395/50, 395/75, 76, 77

[56] References Cited

U.S. PATENT DOCUMENTS 5,060,279  10/1991  Crawford et al. ......................... 382/14
5,544,256  8/1996  Brecher et al. .......................... 382/149

OTHER PUBLICATIONS

"An Experimental Assessment of Preference Aggregation in a Group Decision Support System Based on Multiple Criteria Optimization" Peri H. Iz, 1992 IEEE pp. 185–189.

"Computer Assisted Differential Diagnosis and Management", 1991 IEEE pp. 218–226.

*Primary Examiner*—Kevin J. Teska
*Assistant Examiner*—A. S. Roberts
*Attorney, Agent, or Firm*—Fitzpatrick, Cella, Harper & Scinto

[57] ABSTRACT

A decision support system, including a decision model, provides an indication, either of itself or in combination with a weighted average of the scores assigned to the decision model factors, of the degree to which the pattern of contribution scores corresponds to a benchmark pattern. This indication, referred to as a matching index, can be calculated according to a class of matching index functions, including those based on regression-correlation and Bayesian pattern matching and cost/loss concepts. The matching index also allows the designation of model factors as 'Must Have' or 'Must Not Have' factors, and asymmetric functions for special circumstances. The decision support system can be used to assist in the control of a variety of systems and/or processes and/or in the analysis of information, wherever patterns of information may assist in the selection of an alternative from amongst a set of decision alternatives.

20 Claims, 8 Drawing Sheets

DECISION SUPPORT SYSTEM, METHOD AND ARTICLE OF MANUFACTURE

BACKGROUND OF THE INVENTION

1. Field of the invention

The present invention relates to decision support systems and articles of manufacture related thereto. More specifically, the present invention relates to a decision support system which provides an indication of how closely a pattern of contribution scores of the factors in a decision alternative matches a benchmark pattern which is the contribution scores for a predefined best alternative or another comparative pattern.

2. Description of the Prior Art

Decision support systems are well known. Typically, such systems are implemented on general or special purpose computer hardware and employ a multi criteria model including a system of weights for various factors of interest to the decision. When an alternative (possible decision) is considered, an appropriate score is assigned to each factor in the model, the score representing how well the alternative being considered meets the criteria defined for the respective factor.

When all factors have been scored for an alternative, a weighted average is calculated for that alternative. When weighted averages have been calculated for each alternative, the weighted averages of the alternatives are compared and the decision support system typically presents the alternatives ranked by their weighted averages, with the alternative with the highest weighted average being indicated as the most preferred.

This technique is employed, for example, in the product Which & Why, Version 2, which is manufactured by Arlington Software Corporation, the assignee of the present invention.

Other systems, such as Expert Choice (marketed by Expert Choice Inc., 5001 Baum Blvd., Suite 650, Pittsburg, Pa., USA, 15213) and Criterium Decision Plus (marketed by Sygenex, 15446 Bel-Red Road, Redmond, Wash., USA 98052) use the process described in "The Analytic Hierarchy Process", by Thomas L. Saaty, McGraw Hill 1980. In the Analytic Hierarchy Process (AHP), a decision model is created which includes weighting each of the factors that will influence the decision, with the factors assembled in an hierarchical order with broader classifying factors having lower level child factors down through several levels to the 'leaves' at the bottom of the hierarchy. These last 'leaf' factors are scored. The weightings of the various factors are determined through pair-wise comparisons of the factors, each factor being compared to each other factor and relative weightings assigned.

While such decision support systems, and other methods such as SMART (Simple Multi Attribute Rating Technique, "SMART and SMARTER; Improved Simple Methods For Multi Attribute Utility Measurement", Ward Edwards and F. Hutton Barron, Organizational Behaviour and Human Decision Making, vol. 60, No. 3, pp. 306–325) have enjoyed some success, the present inventors have determined that the ranking and/or selection of various alternatives solely on the basis of their weighted average or aggregate scores does not always result in an appropriate decision being reached (i.e., the best alternative may not be selected).

For example, two alternatives can have the same weighted average but one of the alternatives may have high scores for low-weighted factors and low scores for high-weighted factors while the other alternative may have low to moderate scores for all factors. In such a case, while the two alternatives may have the same weighted average, the second alternative may provide a better overall decision than the first alternative. In fact, the first alternative may have a higher weighted average than the second alternative, despite the fact that the second alternative scored better in more factors than the first alternative, if the first alternative scored higher in one or more high weighted factors. At best, in either of these situations, the evaluator (decision maker) is not presented with clear guidance as to which of the alternatives is better suited to his needs, nor why it is better suited.

At worst, the evaluator does not select the best alternative. It is also possible that no alternative is actually suitable, but the decision support system does not provide any additional information as to why this may be the case.

It is therefore desired to have a novel decision support system which provides an additional measure or measures that, either of itself or in combination with a weighted average, provides an improved indication of the appropriate alternative to select.

SUMMARY OF THE INVENTION

It is an object of the present invention to provide a novel decision support system and method which obviates or mitigates at least some of the above-mentioned disadvantages of the prior art. It is a further object of the present invention to provide a novel article of manufacture which obviates or mitigates at least one of the above-mentioned disadvantages of the prior art.

According to one aspect of the present invention, there is provided a decision support system comprising:

means to define a model of a decision comprising a plurality of factors which are to be considered in making said decision, each said factor having a weight assigned thereto;

means to define at least two alternatives between which said decision is to be made;

means to assign a score to each of said plurality of factors, each said-score providing an indication of how well an alternative meets criteria associated with a respective factor, and to determine the contribution score for each of said plurality of factors;

means to determine a pattern of said contribution scores and to compare said determined pattern to at least one benchmark pattern for said model; and means to indicate the degree of correspondence between said determined pattern and said at least one benchmark pattern to provide a ranking of said alternatives.

Preferably, when the present invention is used to assist in or determine the method of control of a process, said means to assign scores to said factors comprises at least one sensor monitoring an aspect of said process. Also preferably, said means to indicate the degree of correspondence is derived from Bayesian cost analysis or other pattern matching techniques.

According to another aspect of the present invention, there is provided an article of manufacture comprising:

a computer usable medium having computer readable program code means embodied therein for providing a decision support system including an indication of the extent to which the pattern of contribution scores of an alternative in a decision model approaches a benchmark pattern, the computer readable program code means in said article of manufacture comprising:

computer readable program code means for causing a computer to obtain definitions of a plurality of factors to be considered in making a decision, each said factor having a weight assigned thereto;

computer readable program codes means for causing said computer to accept scores for each of said factors, said scores providing an indication of how well an alternative meets criteria associated with a respective factor;

computer readable program code means for determining contribution scores from said accepted scores and respective factor weights; and computer readable program code means for causing said computer to compare the pattern of said determined contribution scores with at least one benchmark pattern to provide a measure representative of the degree of correspondence between said benchmark pattern and the pattern of the said determined contribution scores.

According to another aspect of the present invention, there is provided a decision support system comprising:

means to define a plurality of factors which are to be considered in making a decision, each said factor having a weight assigned thereto;

means to define at least two alternatives between which a decision is to be made;

means to assign a score to each of said plurality of factors for each of said at least two alternatives, said score providing an indication of how well an alternative meets criteria associated with a respective factor;

means to combine each said score with said weight assigned each respective factor for each respective alternative to determine a contribution score and to determine a weighted average from said contribution scores each said alternative to provide a first measure representative of the suitability of each alternative; and means to compare the pattern of the contribution scores for each said alternative to a benchmark pattern representative of a desired alternative and to provide a second measure representative of the degree of correspondence of the pattern of contribution scores of each alternative to the benchmark pattern.

According to another aspect of the present invention, there is provided a decision support system for use with a controlled process or system, comprising:

means to store a model of said process or system, said model comprising a plurality of factors which are to be considered in controlling said process or system, each said factor having a weight assigned thereto;

means to assign a score to each of said plurality of factors, each said score providing an indication of how said system or process meets criteria associated with said respective factor;

means to determine a contribution score for each of said plurality of factors;

means to store at least two benchmark patterns representing a possible alternative for controlling said process or system;

means to compare the pattern of said contribution scores with said at least two benchmark patterns and to provide an indication of the degree of correspondence between said pattern of said contributions scores and each of said at least two predefined benchmark patterns and to select the possible alternative with the highest degree of said correspondence;

output means to implement said selected possible alternative.

According to yet another aspect of the present invention, there is provided a method of making a decision comprising the steps of:

(i) defining a plurality of factors to be considered in reaching said decision, each said factor having a weight associated therewith;

(ii) for each of at least one alternative of said decision, assigning a score to each of said factors representative of how well a respective alternative meets criteria associated with each factor;

(iii) calculating a contribution score for each of said plurality of factors and a weighted average for each of said at least one alternative;

(iv) determining the pattern of said contribution scores for each of said at least one alternative;

(v) comparing each determined pattern of contribution scores to at least one predefined benchmark pattern and providing an indication of the degree of correspondence there between;

(vi) ranking each of said at least one alternatives in order of their respective degrees of correspondence to said at least one benchmark pattern.

BRIEF DESCRIPTION OF THE DRAWINGS

Embodiments of the present invention will be described, by way of example only, with reference to the accompanying drawings, in which.

DETAILED DESCRIPTION OF THE PREFERRED EMBODIMENTS

Figure 1:
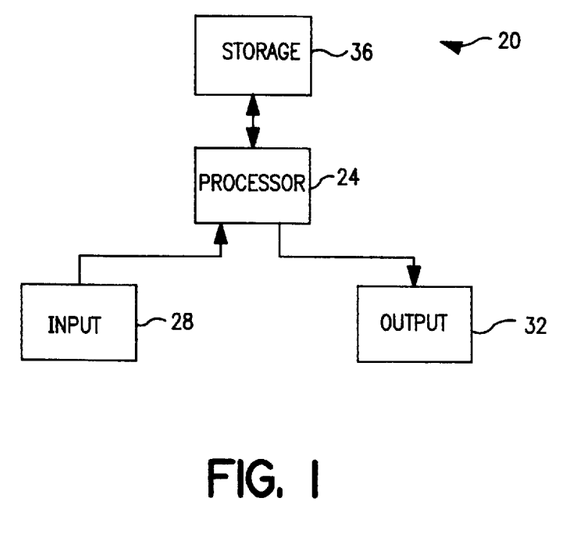
FIG. 1 shows a block diagram of computing hardware embodying a preferred embodiment of the present invention.

FIG. 1 shows a block diagram of a decision support system 20 in accordance with a preferred embodiment of the present invention. System 20 includes processor means 24, input means 28, output means 32 and storage means 36.

Figure 2:
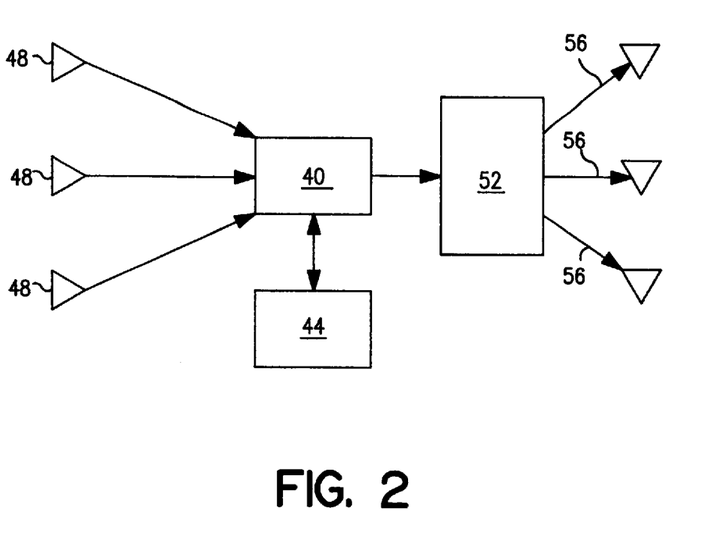
FIG. 2 shows a pictorial representation of an embodiment of the computing hardware of FIG. 1.
Figure 3:
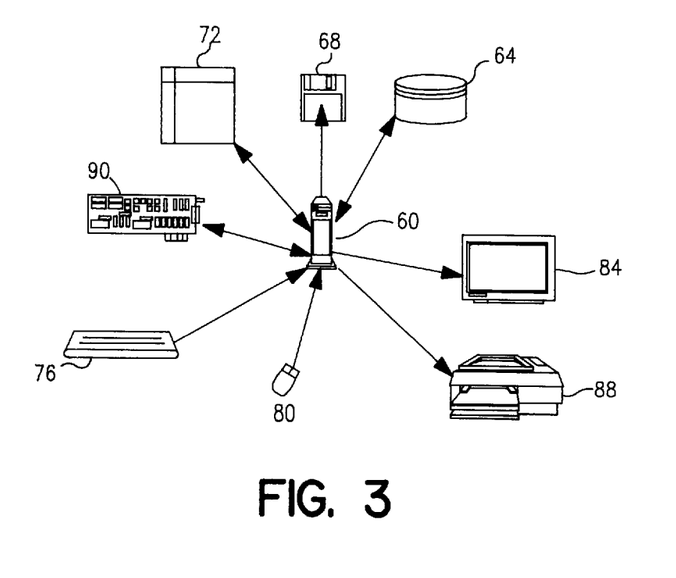
FIG. 3 shows a pictorial representation of another embodiment of the computing hardware of FIG. 1.

In a first preferred embodiment, as shown in FIG. 2, processor means 24 is an embedded control processor, such as a Motorola 68HC16 and associated circuitry 40; storage means 36 comprises a ROM memory 44; input means 28 comprises a series of sensors 48; and output means 32 comprises a known controller 52 for a process which produces appropriate output signals 56. In the embodiment illustrated in FIG. 2, controller 52 can, for example, be an elevator scheduler/controller and sensors 48 may comprise elevator car position sensors, infrared passenger detector sensors, service request counters, timers, etc. This specific implementation of the embodiment of FIG. 2 is discussed in more detail below. In otherwise similar preferred embodiments, wherein system 20 is used to control an industrial process, for example the control of a chemical process reactor, system 20 may be implemented from appropriate discrete components. In such an embodiment, input means 28 can comprise one or more appropriate sensors 48, for example position, load, demand, velocity, pressure and/or temperature sensors, and output means 32 will comprise one or more means to generate control signal outputs, for example variable voltage signals to control dc motor speeds, solenoid valve or brake actuation signals, etc. If required, the signals from sensors 48 can be translated into an appropriate format for processing by processor and associated circuitry 40 by, for example, an analog to digital converter, a protocol converter (in the event that the sensor signals are provided over a network), or other suitable conversion means as would occur to those of skill in the art.

As used herein, the term "process" is intended to encompass commercial, industrial and other processes and to include, without limitation: mechanical and/or electromechanical operations; chemical process control; hvac (heating ventilation and air conditioning) systems; robotic systems; aerospace flight control; biological injection systems; medical monitoring, control and/or alarm systems; power station and electrical power delivery and supply systems; vehicle systems control or any system where a pattern of inputs is analysed and a decision process is invoked to deliver a pattern of actions and outputs to an apparatus or system through mechanical, electrical or other means.

In another preferred embodiment, illustrated in FIG. 3, processor means 24 is a general purpose processor and related circuitry 60, such as an Intel 80×86 family processor; storage means 36 comprises a mass storage device 64, such as a winchester-style disk drive, a removable media storage device 68, such as a 3.5 inch high density disk drive, and RAM and/or ROM memory 72 which is operably connected to processor 60; input means 28 comprises a keyboard 76 and/or pointing device such as a mouse 80; and output means 32 comprises a video display terminal 84, such as a VGA display, and/or a printer 88, such as a HP LaserJet III. In some circumstances, it is contemplated that input means 28 and/or output means 32 may comprise a communications link 90, either in addition to or in place of the above-mentioned components, and communications link 90 may be in the form of a local or wide area network, a radio link, etc. which is also operably connected to processor 60. In the embodiment illustrated in FIG. 3, system 20 can also embody a graphical user interface, provided by an operating system such as Microsoft's Windows 95 operating system, executing on processor 60.

In either of the above-mentioned preferred embodiments, system 20 receives various inputs through input means 28, processor 60 acting on these inputs according to instructions stored in storage means 36 and providing one or more outputs, via output means 32, which outputs recommend and/or implement a desired selection between alternatives and/or the operating state of the process or apparatus under consideration.

As used herein, the term "alternatives" is intended to comprise the case wherein no physical alternative or action is selected. Hence a choice between two alternatives may mean a choice between selecting a physical option or action to perform and not selecting a physical option or action.

A simple example of how such a decision support system operates might be use of the system to assist in the selection of a bicycle for purchase. In this case, the evaluator may have defined a model which includes factors for the Frame, Wheels, Gears and Handlebars, as listed in Appendix A. In this example, the evaluator has identified nineteen factors of importance to the decision and has assigned a relative weight (expressed in this case as a percentage) to each factor. Many conventional decision support systems employ factor weighting to account for the significance of one factor relative to all other factors. The factors are then scored for each available choice (alternative) to be considered with, for example a score of between 0 (not suitable) to 10 (excellent) being assigned to each factor indicating how well the alternative meets the criteria for that factor. When all factors have been scored for all alternatives, a weighted average score is produced for each alternative, with the highest weighted average indicating the recommended decision.

In many circumstances, the factors to be considered will be the same for many different evaluators while the relative weighting of those factors can vary with the evaluator or with time. For example, in the decision model of Appendix A, the evaluator has assigned a weight to the Size factor which is roughly fifteen times that assigned to the factor for the style of the handlebar while another evaluator can assign a lower weighting to Size and a higher weighting to handlebar style. Further, an evaluator may alter the weights assigned to various factors for a variety of reasons, such as to examine "what-if" scenarios, increased experience, etc.

In many cases, it is expected that the factor weighting will be constant while a set of alternatives is being evaluated. However, it is further contemplated that, in some circumstances, some factors may be non-applicable to some alternatives and these non-applicable factors will be ignored for decision purposes and the weightings of the remaining factors adjusted accordingly.

Once the factors have been identified and weights assigned thereto, the evaluator, in turn, examines each alternative available for consideration and assigns a score to each factor representative of how well that alternative meets the criteria for that factor. In this example, each factor is scored on a scale of 0 to 10, wherein 10 is the best score possible. In Appendix B, the results of scoring two alternatives, "Bicycle 1" and "Bicycle 2", are shown.

With conventional decision support systems, the higher weighted average of Bicycle 1 would result in it being the recommended alternative (ignoring cost as a factor). However, it should be noted that, in this example, the high score of Bicycle 1 in the highly-weighted Size factor overwhelms the impact of the factors where Bicycle 1 scored poorly compared to Bicycle 2, such as in Gear Ratio Spread, Frame Type, etc.

The present inventors have determined that another indication of the desirability and/or suitability of an alternative is required, for use either independently, or in conjunction with, the weighted average. The present inventors refer to this indicator as a Matching Index.

Essentially, the matching index provides an indication of how well a particular alternative matches a benchmark alternative which can be a predefined "ideal" alternative that has a maximum score for each factor and therefore the maximum possible weighted average, or another alternative as discussed below. This matching is, at least in a preferred embodiment of the present invention, performed on a pattern matching basis wherein, for example, the pattern of contributions of the scores of an alternative to the weighted average of the alternative is compared to the benchmark pattern. These patterns can be defined as the contribution scores (i.e.—the product of the scores and weights or the scores themselves, in cases wherein the factors weights have the same value). As is clear to those of skill in the art, both the pattern of contribution scores for an alternative and the benchmark pattern are two-dimensional patterns since a number of factors are distributed along the X-axis, and the scores for those factors are distributed along the Y-axis. See, for example, FIGS. 8–11. As shown in those figures, a two-dimensional contribution pattern comprises the factors for a decision alternative which defines the first dimension and the contributions of scores for those factors which defines the second dimension. Likewise, a two-dimensional benchmark pattern comprises the factors for the decision which defines the first dimension and the benchmark scores for those factors which defines the second dimension.

if the maximum score for a factor j is defined as $\zeta_{j;\,max}$ then the weighted average for N factors is:

$$\overline{S}_{max} = \sum_{j=1}^{N} w_j \zeta_{j;max}$$

where $\omega_j$ is the weight assigned to that factor. The fractional contribution $\theta_i$ of a factor i to the weighted average for an ideal alternative (maximum score), is given by:

$$\theta_i = \frac{w_i \zeta_{i;max}}{\sum_{j=1}^{N} w_j \zeta_{j;max}} = \frac{w_i \zeta_{j;max}}{\overline{S}_{max}}$$

For an alternative T under consideration, with factor scores of $\zeta_i$, the contribution to the weighted average of the alternative by each factor i is given by:

$$\theta_i^T = \frac{w_i \zeta_i}{\overline{S}}$$

Then, the contribution gap is defined, for each factor i, as the difference between the contribution of the factor i to the ideal alternative's weighted average and the contribution of the same factor i to the weighted average of the alternative under consideration, specifically:

$$\Delta\theta_i = w_i \left[ \frac{\zeta_{i;max}}{\overline{S}_{i;max}} - \frac{\zeta_i}{\overline{S}} \right]$$

The value $\Delta\theta_i$ is referred to as the contribution gap or the loss from the ideal by factor i.

In the presently preferred embodiment of the present invention, if we set the upper limit of the range of possible scores at 10, i.e., $$\forall_i \zeta_{i;max} = 10$$

then the weighted average for an ideal alternative is $$\overline{S}_{max} = 10$$

and the contribution gap may then be written as $$\Delta\theta_i = w_i \left[ 1 - \frac{\zeta_i}{\overline{S}} \right]$$

Further, it will be apparent that for the ideal alternative $\theta_i = \omega_i$. Hence, an ideal alternative for a decision has the same pattern of contributions as the weights ascribed to each factor in the decision model.

In some circumstances, a non-ideal benchmark alternative may be desired and a different (non-ideal) pattern may be created which is sensitive to a different mode of operation or decision outcome. This pattern may be utilized in this fashion to recognize a given situation closest to a desired or known situation and an appropriate action taken. For example, a benchmark pattern may be selected which represents a known failure mode for a process and the matching index can then be employed to monitor for occurrence of the known failure.

In Bayesian terms [see for example, "Pattern Classification and Scene Analysis", Richard O. Duda and Peter E. Hart, John Wiley and Sons, 1973, page 17], for two alternatives S and T, the function pairs $[\theta^s_i(\omega_i,\zeta_i), \theta^T_i(\omega_i,\zeta_i)]$ can be regarded as discriminant functions. Bayesian decision process, the outcome of the decision in the present invention is not dependent on the result of $[\theta^s_i(\omega_i,\zeta_i), \theta^T_i(\omega_i,\zeta_i)]$.

Instead, these functions represent the error rate in a two category situation with respect to the benchmark alternative, and provide a selection criteria, normally in combination with the weighted average. Accordingly, each alternative is compared only to the benchmark and it is easy to distinguish between two or more alternatives. This is the method presently preferred by the present inventors, and yields an equivalent result to Bayesian cost processes, in a less computationally demanding manner than comparing each alternative to all other alternatives.

The present inventors have determined a class of functions which may be used as matching indices. In mathematical terms, this class of functions is defined as follows: if there exists a set of evaluation values $<y_i(x_i)>$ for a benchmark alternative in the space defined by the paired values $[x_i,y_i]$, where $\forall_i(x_i, y_i) \in R$ and R is the set of all real numbers, and $y_i = y_i(\zeta_i,x_i)$ with $\zeta_i$ existing inclusively in the interval $[\zeta_{i;\,min}, \zeta_{i;\,max}]$, then if the set of $\zeta_i$ values for an alternative are determined by an independent process, the function $$M[\forall_i g(x_i, <y_i> - y_i)]$$

is said to be a matching index if:

$$\lim_{\forall_i \zeta_i \to \zeta_{i;max}} M[\forall_i g(x_i, <y_i> - y_i)] \to \kappa_{max}$$

$$\lim_{\forall_i \zeta_i \to \zeta_{i;min}} M[\forall_i g(x_i, <y_i> - y_i)] \to \kappa_{min}$$

where $$\kappa_{min} \leq M[\forall_i g(x_i, <y_i> - y_i)] \leq \kappa_{max}$$

and $$\kappa = M[\forall_i g(x_i, <y_i> - y_i)]$$

is monotonically increasing or monotonically decreasing with $\forall_i g(x_i, <y_i> - y_i)$, or is constant in a specified sub-range of $[\zeta_i, \zeta_{i;min} \leq \zeta_i \leq \zeta_{i;max}]$ and the function $\forall_i g(x_i, <y_i> - y_i)$ is also monotonic, or constant in a sub-range or ranges of $\zeta_i$ and single-valued with respect to the distribution of its arguments in the space $[x_i, y_i]$. It should be noted that, as used above, the symbol $\forall$ is intended to indicate that all pair points in a given set or subset are included in the evaluation of a function, such as g and M.

In the present embodiment, the inventors have chosen the index domain $[\kappa_{min}, \kappa_{max}]$ as $[0, 1]$, and M belongs to the set of all real positive numbers in this domain.

Accordingly, if the expectation values $<y_i>$ are the actual factor contribution scores (products of the scores and respective weights) contributing to the weighted average of the ideal alternative and the values $y_i$ are the actual contribution scores of a real alternative which contribute to the weighted average of the real alternative, then $g(x_i, <y_i> - y_i)$ represents the loss from the ideal of the ith factor. That is, $g(x_i, <y_i> - y_i)$ is directly equivalent to the set of functions $\{\Delta\theta^T_i(\omega_i, \zeta_i)\}$. Further, the space $[x_i, y_i]$ comprises the product set of weights and scores for every factor [the y-axis] against weights [the x-axis] and may be used to determine the distribution and density of contribution score points. As used herein, the term "contribution score" comprises the product of the score and weight assigned to a factor and, in the circumstance wherein all factors have equal weights, the assigned score per se.

Figure 4:
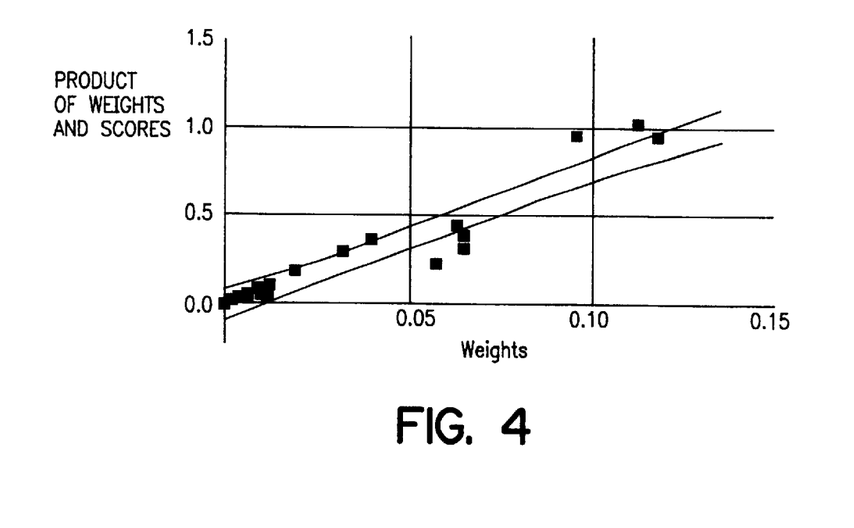
FIG. 4 shows an example scatter plot of the products of scores and weights versus weights.

A scatter plot example of such a space is shown in FIG. 4, and provides a visual representation of the arrangement of the data against the desired pattern for a comparative density distribution or that for an ideal alternative. In the example of FIG. 4, the two lines indicate the 95% confidence intervals, assuming a normal distribution.

The present inventors have, to date, considered two specific classes of matching index functions, namely a Bayesian Cost Matching Index function and a Regression Matching Index function, each of which is discussed in turn below.

Bayesian Cost Matching Index function are based on the loss (cost), from the desired (benchmark) pattern, as a sum of the absolute differences between the contribution of each factor to the overall weighted average for the alternative and the contribution that each factor would provide for the benchmark pattern. As described above, an ideal alternative has a factor contribution score distribution which is exactly equal to that of the factor weights and the products of the respective scores and weights have the same distribution if the factors are all assigned the same score. A non-ideal pattern would have a weighting pattern sensitive to particular patterns of inputs. The matching index function which follows from this definition is given by $$M_R = 1 - \frac{1}{2} \sum_i |\Delta\theta_i|$$

where $\Delta\theta_i$ is the loss from the pattern due to the ith factor, and is given by $$g_i\left(w_i, \frac{\zeta_{i;max}}{\overline{S}_{max}} - \frac{\zeta_i w_i}{\overline{S}}\right) = \Delta\theta_i = w_i\left(1 - \frac{\zeta_i}{\overline{S}}\right)$$

where $\zeta_i$ is the score for the ith factor. This is referred to by the present inventors as the Robins Matching Index.

The Robins Matching Index is an example of a direct Bayesian Cost approach. However, a second approach by Lobley arrives at a very similar equation, only the discriminant function of which is slightly modified. It can be shown that the worse case contribution gap occurs when one factor with the minimum weight has a non-zero score and all other factors have zero scores. Under the Lobley scheme, the fractional loss for the ith factor is $$g_i\left(w_i, \frac{\zeta_{i;max}}{\overline{S}_{max}} - \frac{\zeta_i w_i}{\overline{S}}\right) = \frac{\Delta\theta_i}{(1 - w_{i;min})}$$

and yields the Lobley-Robins fractional loss Matching Index $M_{LR}$ in the next equation. The factor of one-half appears because the absolute value of each difference only is taken.

$$M_{LR} = 1 - \frac{1}{2} \sum_{i=1}^{N} \frac{|\Delta\theta_i|}{(1 - w_{i;min})}$$

The Regression Matching Index function is based on the premise that the degree of correlation between the product of the respective scores and weights of an alternative to the weights of the benchmark alternative indicates the closeness of the match. The matching index is calculated from the standard ANOVA equation $$r = \frac{N\Sigma x_i y_i - \Sigma x_i \Sigma y_i}{[N\Sigma x_i^2 - (\Sigma x_i)^2]^{1/2}[N\Sigma y_i^2 - (\Sigma y_i)^2]^{1/2}}$$

where r is the correlation r-value, x is the weight, y is the product of the scores and weights and N is the number of factors.

It is contemplated that in some circumstances a decision model may be divided into two or more independent groups of factors for pattern matching purposes, and that the matching index can be calculated for each group of factors. Under these circumstances, the overall matching index is the product of the matching indices of all the pattern groups. Specifically, the overall matching index may be written as $$M = \prod_{j=1}^{K} M_j$$

where the number of separate factor groups is K and $M_j$ is the matching index of the scores assigned to the jth group.

The above described product of the matching indices also allow for one or more factors to be deemed 'Must Haves' or 'Must Not Haves'. A 'Must Have' is defined as having a matching index of 1, if present, or 0, if absent. As an example, if a set of factors has a matching index of $M_1$ and there is a set of 'Must Haves' with matching indices of $M_2$ through $M_m$, the product of the matching index will be zero unless all of the 'Must Haves' are present in the alternative. The definition of 'Must Not Have' is also simple in that a 'Must Not Have' has a matching index of 0, if present, and 1 if absent.

It is also contemplated that "Must Haves" and "Must Not Haves" may be modified to produce asymmetric matching indices. These indices are zero for part of the index domain [0,1] in the present formulation, and then become part of the overall pattern of contribution scores, or may be regarded as independent patterns. Thus, a group of factors may be considered together or individually such that when they exceed, individually or as a group, a certain average value (by products of weights and scores or scores alone), the positive going ("Must Have") asymmetric matching index may be one or a constant or a value dependent on the score or scores and/or weights, and zero if the minimum or minima are not reached. "Must Not Haves" have their asymmetric equivalent by having a maximum value beyond which the negative-going asymmetric matching index is zero, while below which it is constant in value or dependent on the scores and / or weights or combination of the two.

In the presently preferred embodiment, the "Must Have" and positive-going asymmetric matching indices are implemented as these are the most obvious to apply. They are defined by:

$$M_{+A;K} = \begin{cases} M[\forall_{i \in K} g(x_i, (<y_i> - y_i))], & \text{iff } \forall_{i \in K} g(x_i, (<y_i> - y_i)) \geq g_{lim} \\ const \leq 1, & \text{iff } \forall_{i \in K} g(x_i, (<y_i> - y_i)) < g_{lim} \end{cases}$$

and the converse negative-going asymmetric Matching Index is defined by:

$$M_{-A;K} = \begin{cases} M[\forall_{i \in K} g(x_i, (<y_i> - y_i))], & \text{iff } \forall_{i \in K} g(x_i, (<y_i> - y_i)) \leq g_{lim} \\ const \leq 1, & \text{iff } \forall_{i \in K} g(x_i, (<y_i> - y_i)) > g_{lim} \end{cases}$$

where K is the group of factors included in the pattern under consideration.

In a group consensus / decision making mode of the preferred embodiment, weights may be assigned to each member of the group of evaluators to reflect seniority or other ranking considerations, such as the degree of involvement of the evaluator in the result of the decision. In such a case, the group matching index M may be expressed as.

$$\overline{M} = \sum_{j=1}^{J} W_j M_j$$

where there are J evaluators in the group and $W_j$ and $M_j$ represent, respectively, the weight and matching index assigned to the jth evaluator.

Returning now to the example bicycle purchasing decision given in Appendices A and B, the Bicycle 1 alternative has a (Lobley-Robins) matching index of 0.7 while the Bicycle 2 alternative has a matching index of 1 using the ideal alternative as a benchmark. This matching index provides a clear indication to the evaluator of how well the pattern of contribution scores for each alternative matches the benchmark alternative. In this example, the benchmark alternative is the ideal alternative and, as that ideal alternative is by definition a model of the various considerations and their importance to the evaluator, the matching index indicates how well an alternative fits the evaluator's wants and/or needs.

For the Bayesian cost method of calculating the matching index, the matching index has been shown to be independent of the weighted average for all test distributions calculated thus far and the present inventors currently believe it to be independent for all distributions. On the other hand, ANOVA methods assume a normal distribution for the independent data which in many decision models is not likely to be the case. The Regression Matching Index is thus not appropriate when the distribution of weights and scores and/or their functional combinations used in the ANOVA determination of the index significantly differ from normal. As a result, statistical tests have been developed to check for out-of-bound (i.e.—out of reasonable bounds for normal distributions) as a guide to an evaluator and to ensure that results are not biased due to the assumptions in the ANOVA method.

Accordingly, while the regression matching index is included in this discussion, the presently preferred method of calculating the matching index is the above-described Bayesian cost method. Of the two Bayesian cost methods, the Lobley-Robins is presently preferred as it can provide a greater spread of results when used with a model containing low numbers of factors.

A combined indication of the suitability of an alternative may also be obtained by calculating the product of the weighted average and matching index for each alternative. In the bicycle purchase example, Bicycle 1 has a combined weighted average and matching index score of 3.87 (i.e.– 5.53×0.7) and Bicycle 2 has a combined weighted average and matching index score of 5.0 (i.e.–5.0×1.0). This provides an improved indication that, despite the higher weighted average of the Bicycle 1 alternative, the Bicycle 2 alternative more closely meets the considerations of the decision model.

Figure 5:
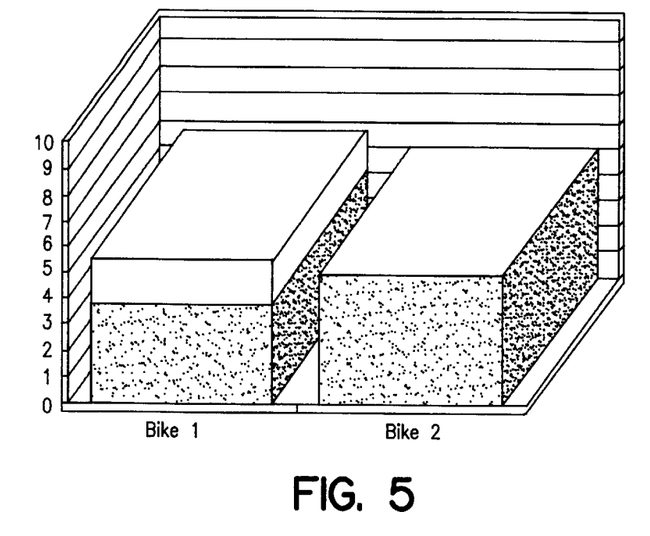
FIG. 5 shows a graph indicating the effect of combining a matching index with a weighted average.

FIG. 5 shows a graphic representation of the effect of combining the matching index with the weighted average. In this figure, the total height of each column indicates the weighted average score of the respective alternative, while the lower portion of each column indicates the product of the weighted average and the matching index. Accordingly, the upper portion of each column indicates the loss, if any, in the weighted average due to the matching index. In this example, the effect of the combination of the matching index and the weighted average results in the reversal of the ranking of the two alternatives.

In many circumstances, if additional information involving the costs associated with an alternative is included, additional decision making information may be provided in the form of a cost per evaluation point (either the weighted average, the matching index or the product of the weighted average and the matching index) and/or a cost equivalency in which the cost/ benefit of other alternatives is compared to the recommended alternative. The cost/benefit for an alternative T, may be expressed by $$B^T = \frac{C^T}{M^T S^T}$$

where $C^T$ is the total cost to be included, $M^T$ is the matching index for the alternative and $S^T$ is the weighted average for the alternative. The cost equivalency of another alternative A may be expressed as $$B^A_{eq} = B^T M^A \overline{S}^A$$

In the bicycle purchasing decision example discussed above, if Bicycle 1 has a cost of $400 and Bicycle 2 has a cost of $550, the price per evaluation point (in this example, the product of the weighted average and the matching index) for Bicycle 1 is 104 (400 divided by 3.85) and for Bicycle 2 is 110 (550 divided 5.0). This also leads to a indication of a value/price equivalency for Bicycle 2 of $519, i.e. - if the price of Bicycle 2 can be bargained down to this value/price point, it will match the Bicycle 1 alternative in terms of value (equivalent suitability to the decision model) for price.

Further, it will be apparent to those of skill in the art that other considerations, such as perceived risk, can be considered in the decision process in the same manner as cost. For example, the perceived risk for each alternative may be assigned a relative number and a risk per evaluation point and value/risk equivalency point.

Figure 6:
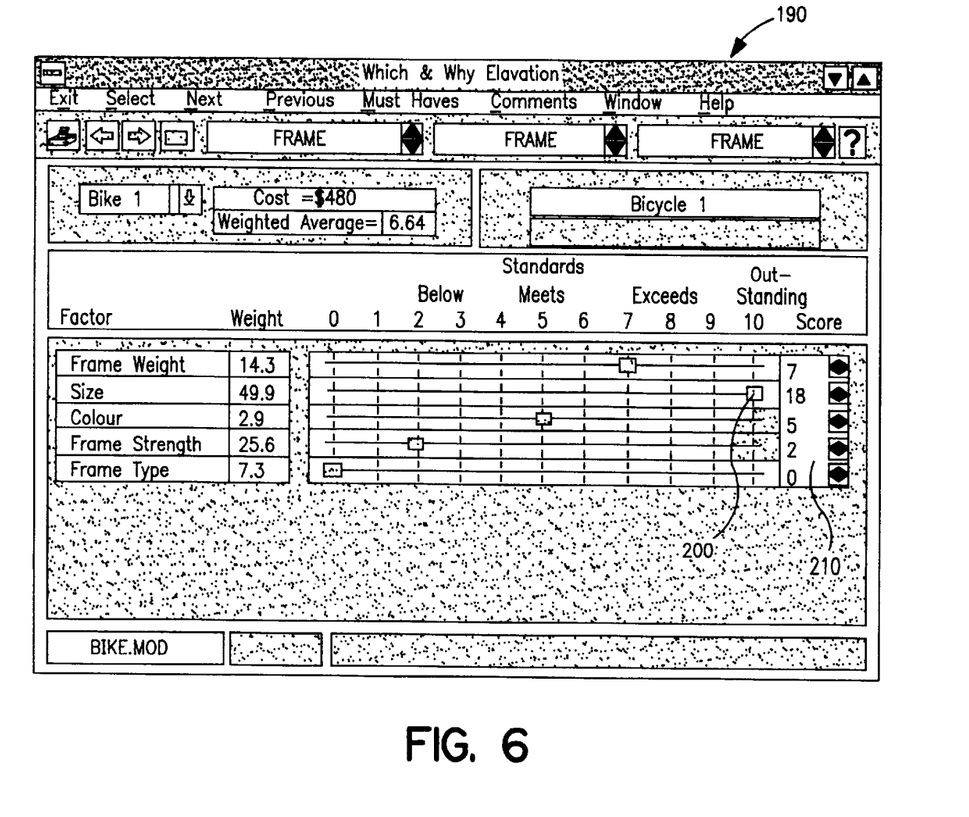
FIG. 6 shows an input screen used with the embodiment of FIG. 3 to input a score for factors of an alternative in a decision making process.

FIG. 6 shows an input screen 190 which can be used with the embodiment of FIG. 3 to input scores for some of the factors for Bicycle 1 of the above-discussed example of a Bicycle Purchase decision. On this screen, the factors relating to the Frame of a bicycle have been grouped and the weight assigned to each factor is displayed beside the factor's description. For example, the "Frame Weight" factor has a weight of 14.3%. A score is assigned to each factor by the user, either through manipulation of the slider bars 200, or by entering a number between 0 and 10 in the spin box 210 at the far right side of the screen.

Figure 7:
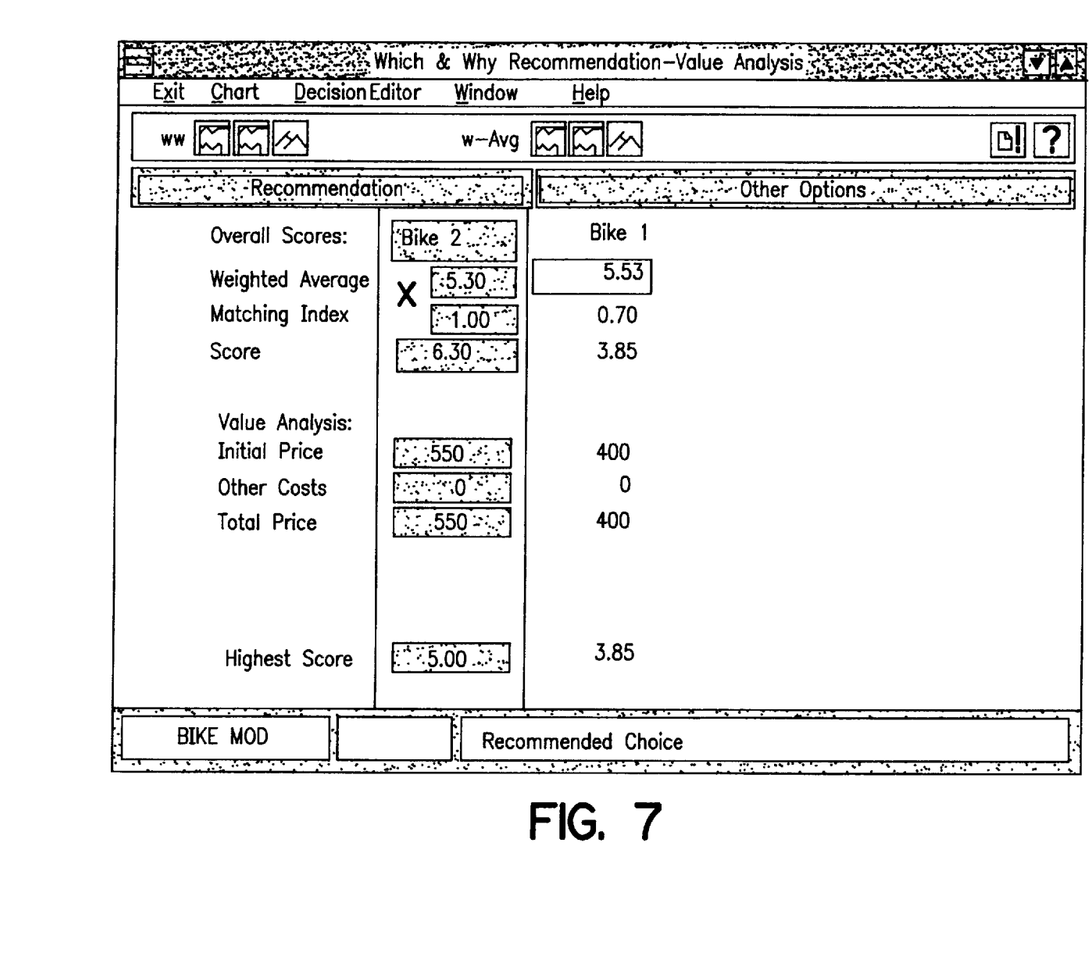
FIG. 7 shows a recommendation screen used with the embodiment of FIG. 3 to present a recommended alternative.

FIG. 7 shows a Recommendation screen 300 which can be used with the embodiment of FIG. 3 to present recommendations based upon the product of the matching index and weighted average to the evaluator. In this example, Bicycle 2 is recommended as its Score is 5.00 versus 3.85 for Bicycle 1.

Figure 8:
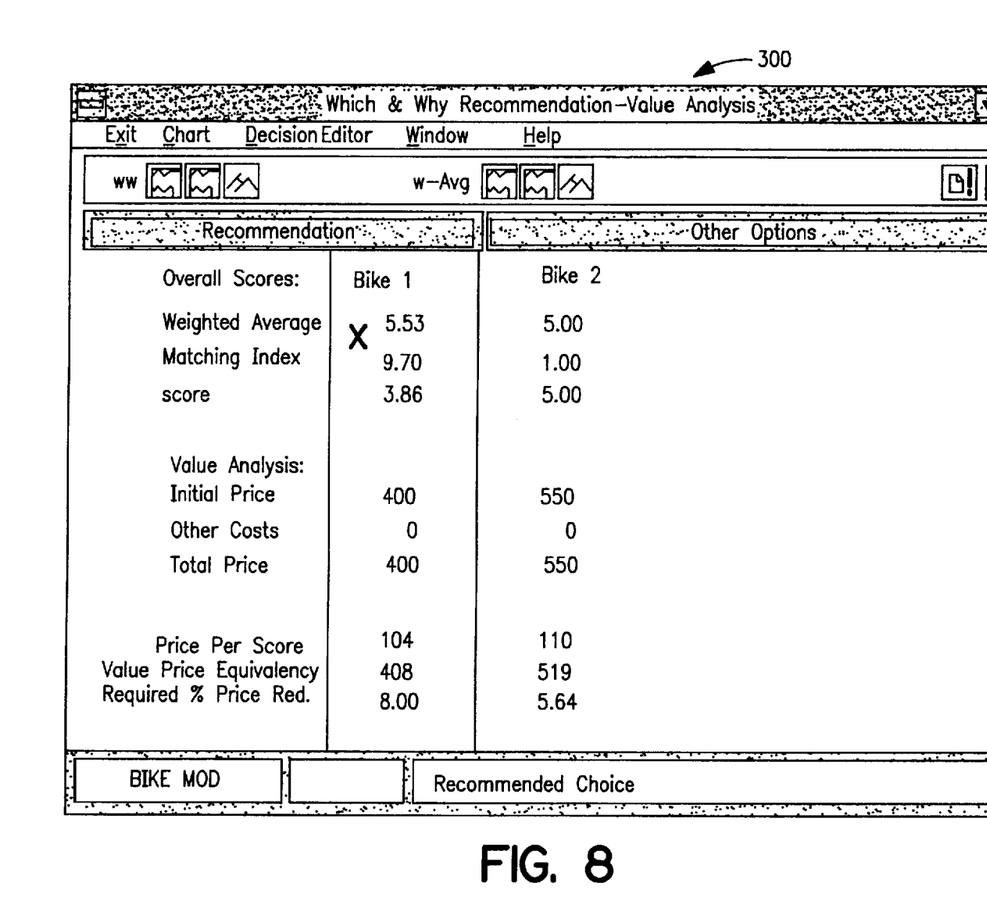
FIG. 8 shows another recommendation screen used with the embodiment of FIG. 3.

FIG. 8 shows another form of Recommendation screen 300 which can be used with the embodiment of FIG. 3 to present recommendations based upon Price per Score (Cost / Benefit) analysis. In this specific example, Bicycle 1 is recommended with a Price per Score of 104 versus a Price per Score 110 for Bicycle 2. Also indicated, is the required price reduction of 5.64% in Bicycle 2's price which would result in equivalent Price per Scores for both alternatives.

Figure 9:
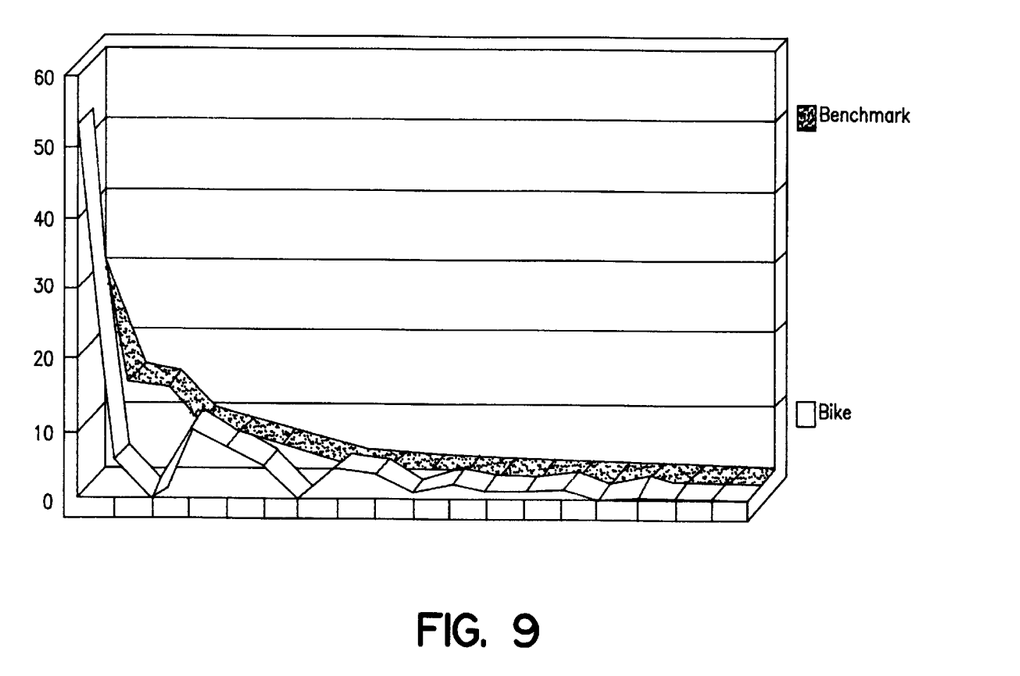
FIG. 9 shows a tape-style graph indicating the percentage contribution of each factor in an alternative of a decision model relative to benchmark weightings.

FIG. 9 shows a tape-style graph which is a visual representation which can be available to the user of the embodiment of FIGS. 2 or 3 showing how the contribution of the factors (i.e.—scores times weights) of an alternative compares to the factor weightings of the decision model.

Figure 10:
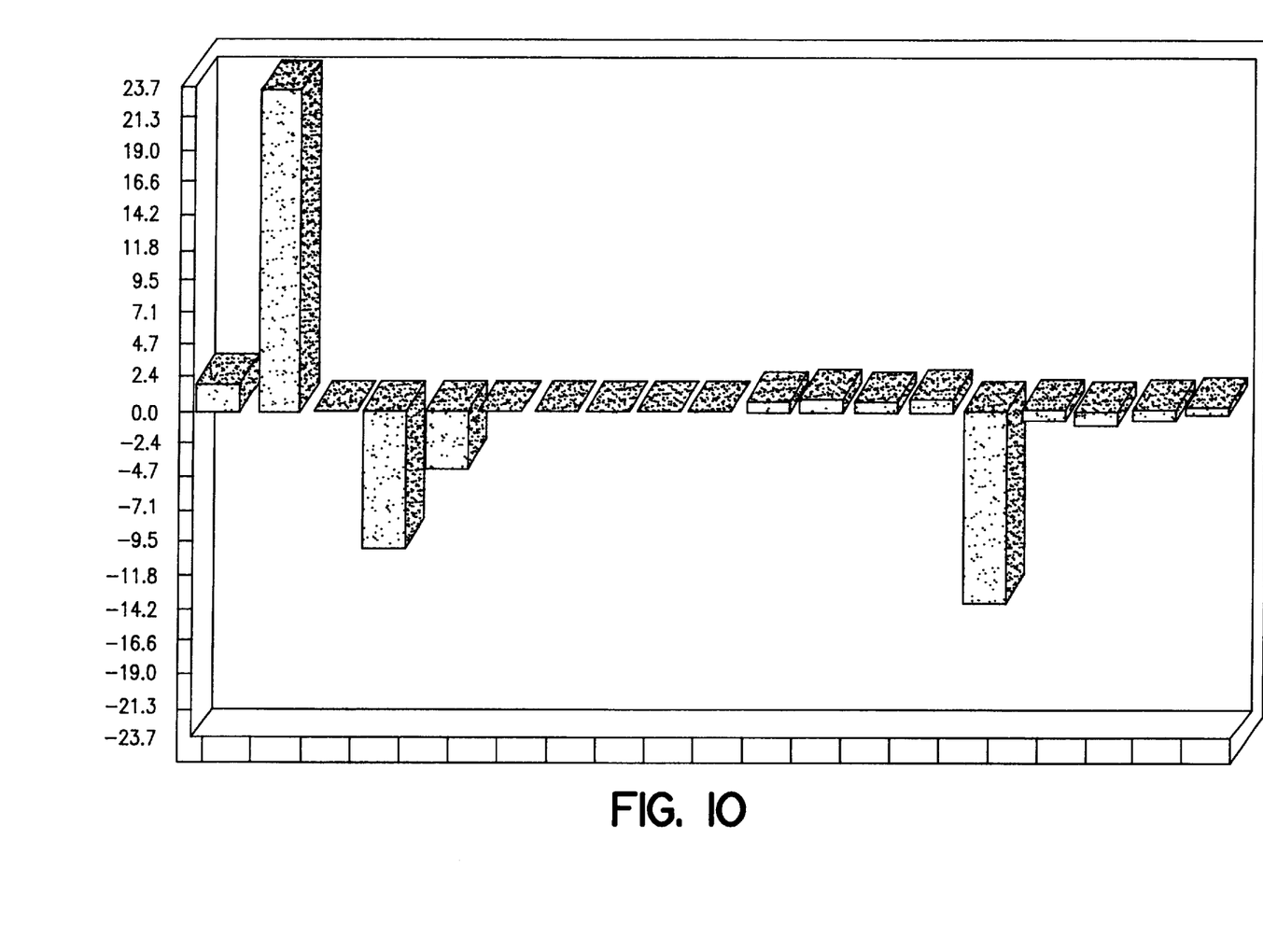
FIG. 10 shows a histogram of a pattern of factor contributions for an alternative.

FIG. 10 shows a histogram which is a visual representation of the contributions of the factors (i.e.—the products of the scores and weights) of the Bicycle 1 alternative. In the Figure, the contributions are displayed in the order of the model, as listed in Appendices A and B, with the "Frame Weight" factor being the leftmost and the "Handlebar Comfort" factor being the rightmost.

Figure 11:
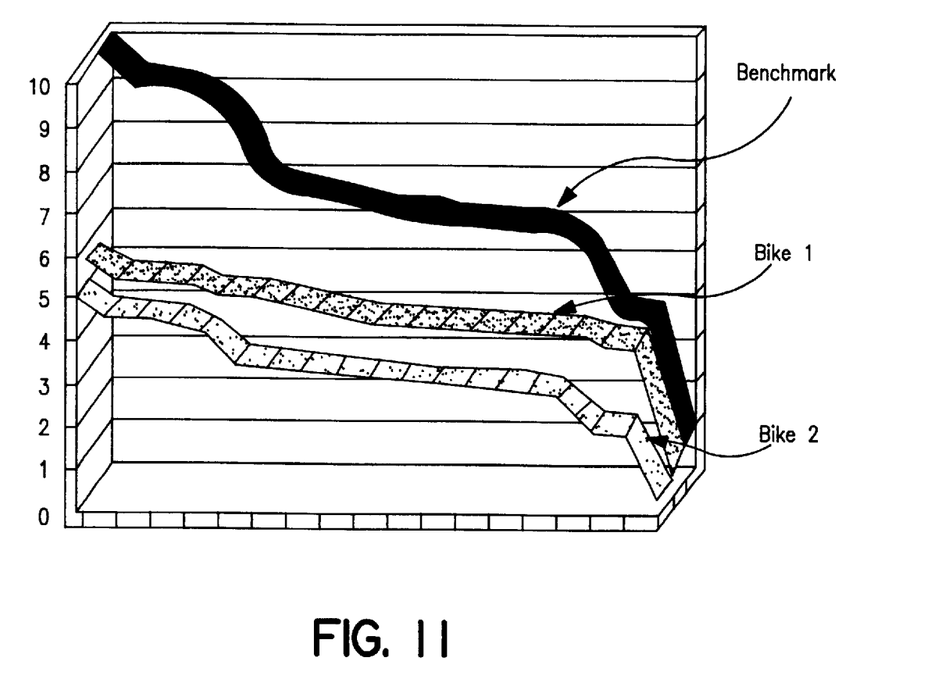
FIG. 11 shows a tape-style graph indicating a cumulative contribution of factors in two alternatives versus benchmark weightings.

FIG. 11 shows a tape-style graph which is a visual representation of the cumulative contributions of the factors (the products of the scores and weights) for each of the Bicycle 1 and Bicycle 2 alternatives and the model weights. As with FIG. 10, the contributions are displayed in the order of the model, as listed in Appendices A and B.

FIG. 5, 9, 10 and 11 are intended to provide an evaluator with a visual indication of how well an alternative matches the decision model and thus, an indication of why an alternative is, or is not, suitable. It is contemplated that, in situations wherein the present invention is employed to assist in control of a process or other industrial activity, FIGS. 5, 9, 10 and/or 11 may be displayed in real time, for example on video display terminal 84, to allow the decision making process to be monitored. Of course, it will be apparent to those of skill in the art that the present invention is not limited to the visual displays of FIGS. 5, 9, 10 and 11. Other suitable displays, as will occur to those of skill in the art, can be employed in addition to, or instead of, those of FIGS. 5, 9, 10 and 11.

As briefly mentioned above with respect to the embodiment of FIG. 2, another example of a decision support system in accordance with the present invention is that of an elevator scheduling/dispatch system. As is known, such a system may be capable of operating in one of several modes, including: an energy conservation mode; a priority servicing mode; a peak traffic mode; and an off hours mode. In the energy conservation mode, for example, it is desired that the minimum number of trips are made for the total number of elevator cars to reduce energy requirements. As another example, in peak traffic mode it is desired that elevator cars give priority to service requests from the lobby of the building to maximize the ability to move passengers from the lobby.

In this decision support system example, a single set of scores are evaluated, those scores being for factors such as, for example: the average time a passenger on a floor of the building must wait before arrival of an elevator car, as determined by a timer; the number of waiting passengers in the building lobby, as determined by an infrared sensor; the energy required to operate in a particular mode, as predefined in a ROM memory; the number of UP service request buttons which are presently pending in the building, as determined by a counter; the number of DOWN service request buttons which are presently pending in the building, as determined by a counter; the average time delay between the pressing of a service request button and the arrival of an elevator, as determined by a timer; the time of day, as determined by a clock; the day of week, as determined by a clock/calendar; etc.

Then, rather than calculating how well two or more sets of contribution scores match an ideal benchmark, a 'comparison' benchmark is defined for each operating mode (alternative) and matching indices are calculated for the single set of contribution scores against each comparison benchmark. These comparison benchmarks may be determined empirically, through an analytic process, or by any other suitable means as will occur to those of skill in the art and represent the scoring conditions that best suit an operating mode (alternative).

Accordingly, either on an on-going basis, or at predefined intervals, a selection of the operating mode alternative is made according to the highest matching index. Specifically, if the pattern of factor scoring for the single set of contribution scores most closely matches the pattern of the comparison benchmark for the energy conservation mode alternative, for example, the energy conservation operating mode alternative is selected. If the pattern of factor scoring for the single set of contribution scores most closely matches the pattern of the comparison benchmark alternative for the peak service mode alternative, the peak service mode alternative is selected. Alternatively, the selection may be made on the basis of the product of the weighted average and the matching indices.

It is contemplated that input scores can also be assigned on a per elevator car basis (or on the basis of predefined banks of floors) and group matching indices appropriately derived. Also, one or more 'Must Haves' can be defined, for example a factor may be defined that requires a favoured tenant to be ensured arrival of an elevator car within a predefined period of time after pressing a service button. Further, bias may be introduced, if desired, by adjusting the weights of one or more factors from which the weighted average is calculated. In the simplest unbiased situation, all factor weights will be equal.

In this example, the decision process is effectively turned around, i.e. - the process starts from a pattern derived from the scores and weights and a selection of an alternative is made on the basis of the best match of the current contribution score pattern to one of a predefined benchmark pattern. It is contemplated that learning the states of a process or system by patterns of scores and weights will enable the system to create new learning situations and actions automatically. As well, the amount of required computation is reduced since the set of benchmark patterns can be pre-stored, in addition to others which may be "learnt" by the system.

It is also contemplated that other benchmark patterns may be selected for particular uses. For example, in the above-discussed elevator example, a benchmark pattern may be selected which is particularly sensitive to a pattern of inputs which represents a common mode failure occurring in an elevator car or the elevator system. In such a case, a matching index can be calculated for this benchmark pattern, instead of or in addition to, the above-described benchmarks and a high resultant matching index would indicate that a common mode failure is occurring and remedial action must be taken.

It is also contemplated that decision support systems can serve in an analysis role, and act across systems using the interactive nature between two decision systems, implementing and simplifying decision tree processes that are currently used.

As an example of the possibilities available from the matching index and its associated methodology is given in an improved urban transit bus system. In this system, buses are allocated in an "On Demand" basis and with regard to time of day and week, number of current users, user destinations (obtained by users indicating their destination when summoning the vehicle) and a plurality of other factors.

Conventionally, such a complex system might be resolved using a decision tree programmed into a computer onboard the bus. In such a case, the bus which is closest to a passenger requesting service may be redirected to pick up that passenger because this is the priority given to the decision at the decision node which the bus may find itself at. While in theory this may be efficient, in practice efficiency suffers as decision trees are sequential, in the sense that they examine input at different stages of the decision process which may change prior to the final decision being reached, leading to a confusion and proliferation of decision nodes in the decision making process, or backtracking up the tree, or restarting at the root of the tree. With the present invention, all factors are present at once, and the decision support system in the bus responds by examining the changing scores assigned to those factors (these factors can be related to the number of people in the bus, those calling the bus, the relative position of the bus to the last caller, the nearness and "fill score" of neighboring buses etc.) All factors are automatically scored and weighted in the decision support system onboard the bus.

In this example, a particular bus may be half full (scoring a five on a ten point scale, for example) and all of its passengers may have different intended destinations (scoring an eight on a ten point scale for the factor relating to the desirability of having the bus stay with its current path, for example). The decision support system in the bus can accordingly decide to ignore the request to pick up a new, nearby, passenger in view of the scores and the matching index derived from those scores, relative to the benchmark alternative (which can be the ideal, best-service, alternative). This information is relayed back to a central decision support system, via radio transmission, which scores the operation of a group of buses. The central decision support system may override the particular bus' decision to continue without pickup because the weight and/or matching index derived by the central decision support system for the passenger pick-up is higher than the weight and/or matching index given by the decision support system on the bus. In this case, the bus is forced by the central decision support system to change its decision, for example by the central decision support system radioing a modification to a redefined Must Have factor in the bus' decision support system, and pick up he passenger.

Hence a control system and pattern matching system of the type described herein uses the matching index or combination of matching indices as an estimator or estimators for the best match with predetermined benchmark patterns assigned to each bus situation, thereby providing a decision for action or for the purposes of analysis.

The present invention provides a novel decision support system for use with the control of processes, or for use by individuals and the like, wherein an indication referred to as a matching index is employed either on its own, in addition to, or in combination with, a weighted average in assessing the suitability of one or more alternatives. The matching index provides an indication of how well the pattern of contribution scores compares to a benchmark pattern.

Recommendations may be derived based upon the matching index, the product of the matching index and the weighted average or either of the above alone or in combination with costs associated with each alternative. In addition, factors may be identified as 'Must Haves' and/or 'Must Not Haves' in determining matching indices. Also, matching indices can be derived, with appropriate weights, for alternative scorings assigned by members of a group, whether they are human, automatic sensors or a combination of both, hence providing a means of consensus decision making.

Appendix A

| Factor | Weight |
| --- | --- |
| Frame weight | 8.37% |
| Size | 29.25% |
| Colour | 1.73% |
| Frame strength | 15.02% |
| Frame type | 4.30% |
| No.Spoke Xover | 0.56% |
| Wheel weight | 0.37% |
| Wheel aerodynamics | 0.89% |
| Wheel material | 1.28% |
| Wheel finish | 0.28% |
| Wheel maintenance | 1.84% |
| Gear manufacturer | 2.60% |
| Shifter location | 1.26% |
| Gear material | 2.90% |
| Gear ratio spread | 13.81% |
| Gear maintenance | 5.46% |
| Handlebar style | 1.96% |
| Handlebar mat'l | 0.94% |
| Handlebar comfort | 7.18% |
| TOTAL | 100% |

Appendix B

|  |  | Bicycle 1 | Bicycle 2 |
| --- | --- | --- | --- |
| 8.37% | Frame weight | 7 | 5 |
| 29.25% | Size | 10 | 5 |
| 1.73% | Colour | 5 | 5 |
| 15.02% | Frame strength | 2 | 5 |
| 4.30% | Frame type | 0 | 5 |
| 0.56% | No.Spoke Xover | 4 | 5 |
| 0.37% | Wheel weight | 6 | 5 |
| 0.89% | Wheel aerodynamics | 6 | 5 |
| 1.28% | Wheel material | 5 | 5 |
| 0.28% | Wheel finish | 5 | 5 |
| 1.84% | Wheel maintenance | 7 | 5 |
| 2.60% | Gear manufacturer | 8 | 5 |
| 1.26% | Shifter location | 8 | 5 |
| 2.90% | Gear material | 8 | 5 |
| 13.81% | Gear ratio spread | 0 | 5 |
| 5.46% | Gear maintenance | 5 | 5 |
| 1.96% | Handlebar style | 3 | 5 |
| 0.94% | Handlebar mat'l | 2 | 5 |
| 7.18% | Handlebar comfort | 6 | 5 |
|  | Weighted Average | 5.53 | 5.00 |

What is claimed is:

1. A computer-implemented decision support machine for comparing two alternatives, which alternatives are physical objects or physical activities, said machine comprising:

memory means for storing a decision data structure having a plurality of decision factors, each said decision factor having a weight assigned thereto, the plurality of weighted factors comprising a predetermined two-dimensional benchmark pattern;

input means for inputting a first plurality of scores for a first competing alternative to the decision factors of said decision data structure, and for inputting a second plurality of scores for a second competing alternative to the decision factors of said decision data structure;

processing means for (i) transforming the first plurality of scores into a first two-dimensional contribution pattern, (ii) transforming the second plurality of scores into a second two-dimensional contribution pattern, (iii) pattern-matching the first contribution pattern and the benchmark pattern to produce a first matching index, and (iv) pattern-matching the second contribution pattern and the benchmark pattern to produce a second matching index; and output means comprising a graphical display to output on said display at least one output signal corresponding to at least one of the first and second matching indexes to provide a comparison of said competing alternatives.

2. A decision support machine according to claim 1 wherein said processing means comprises a processor which controls a controlled process, and wherein said input means comprises at least one sensor monitoring said controlled process.

3. A decision support machine according to claim 2 wherein each said alternative comprises an operating mode of said controlled process.

4. A decision support machine according to claim 1 wherein said processing means performs a linear regression of said first and second plurality of scores.

5. A decision support machine according to claim 1 wherein said processing means performs a Bayesian cost analysis of said first and second plurality of scores.

6. A decision support machine according to claim 1 wherein said processing means computes a weighted average for each said first and second plurality of scores, and wherein said output means outputs on said display at least one weighted signal corresponding to at least one of the weighted averages.

7. A decision support machine according to claim 6 wherein said display displays both the at least one output signal and the at least one weighted signal.

8. A decision support machine according to claim 1 wherein said memory means stores two benchmark patterns each of which corresponds to one of said alternatives, and wherein said processing means pattern-matches each contribution pattern against both of the two benchmark patterns.

9. A decision support machine according to claim 8 wherein said processing means comprises a processor which controls a controlled process, and wherein said input means comprise a at least one sensor monitoring said controlled process.

10. A decision support machine according to claim 9 wherein each said alternative comprises an operating mode of said controlled process, each said alternative having a benchmark pattern associated therewith.

11. A decision support system for use with a controlled process or system, comprising:

means to store a model of said process or system, said model comprising a plurality of factors which are to be considered in controlling said process or system, each said factor having a weight assigned thereto;

means to assign a score to each of said plurality of factors, each said score providing an indication of how said system or process meets criteria associated with said respective factor;

means to determine a contribution pattern for said plurality of factors;

means to store at least two benchmark patterns each representing a possible alternative for controlling said process or system;

means to pattern-match the contribution pattern with said at least two benchmark patterns and to provide an indication of the degree of correspondence between said contribution pattern and each of said at least two benchmark patterns and to select the possible alternative with the highest degree of said correspondence; and graphical display means to display said provided indication.

12. A decision support system according to claim 11 wherein said means to assign a score comprises one or more sensors responsive to said process or system being controlled.

13. A decision support system according to claim 12 wherein said degree of correspondence is determined with Bayesian cost techniques.

14. A decision support system according to claim 12 wherein said degree of correspondence is determined with correlation-regression techniques.

15. A computer-readable storage medium for storing a program which, when processed by a computer, causes the computer to compare two alternatives which are physical objects or physical activities, the program causing the computer to perform the following functions:

storing a decision data structure having a plurality of decision factors, each decision factor having a weight assigned thereto, the plurality of weighted factors comprising a predetermined two-dimensional benchmark pattern;

inputting a first plurality of scores for a first competing alternative to the decision factors of said decision data structure;

inputting a second plurality of scores for a second competing alternative to the decision factors of said decision data structure;

transforming the first plurality of scores into a first two-dimensional contribution pattern;

transforming the second plurality of scores into a second two-dimensional contribution pattern;

pattern-matching the first contribution pattern and the benchmark pattern to produce a first matching index;

pattern-matching the second contribution pattern and the benchmark pattern to produce a second matching index; and outputting on a computer display at least one output signal corresponding to at least one of the first and second matching indexes to provide a comparison of said competing alternatives.

16. A storage medium according to claim 15, wherein said program further causes said computer to calculate a first weighted average corresponding to the first plurality of scores, and to calculate a second weighted average corresponding to the second plurality of scores, and to output at least one weighted average signal corresponding to at least one of the first and second weighted averages.

17. A storage medium according to claim 15, wherein said program further causes said computer to output a signal which causes said computer display to display, in overlapping fashion, the first contribution pattern and the benchmark pattern.

18. A decision support method for comparing two alternatives which are physical objects or physical activities, comprising the steps of:

storing a decision data structure having a plurality of decision factors, each decision factor having a weight assigned thereto, the plurality of weighted factors comprising a predetermined two-dimensional benchmark pattern;

inputting a first plurality of scores for a first competing alternative to the decision factors of said decision data structure;

inputting a second plurality of scores for a second competing alternative to the decision factors of said decision data structure;

transforming the first plurality of scores into a first two-dimensional contribution pattern;

transforming the second plurality of scores into a second two-dimensional contribution pattern;

pattern-matching the first contribution pattern and the benchmark pattern to produce a first matching index;

pattern-matching the second contribution pattern and the benchmark pattern to produce a second matching index; and outputting on a computer display at least one output signal corresponding to at least one of the first and second matching indexes to provide a comparison of said competing alternatives.

19. A machine for comparing the attributes of two physical objects of a single class of physical objects, comprising:

an input device for inputting a first plurality of scores corresponding to attributes of a first physical object, and for inputting a second plurality of scores corresponding to attributes of a second physical object;

a memory for storing a predetermined two-dimensional benchmark pattern corresponding to a predetermined plurality of attributes for the single class of physical objects;

a processor for (i) transforming the first plurality of scores into a first two-dimensional contribution pattern, (ii) transforming the second plurality of scores into a second two-dimensional contribution pattern, (iii) two-dimensional pattern-matching the first contribution pattern and the benchmark pattern to produce a first matching index, (iv) two-dimensional pattern-matching the second contribution pattern and the benchmark pattern to produce a second matching index, (v) calculating a first weighted average corresponding to the first plurality of scores, (vi) calculating a second weighted average corresponding to the second plurality of scores; and a graphical display connected to said processor and operable to display the first and second matching indexes and the first and second weighted averages.

20. A machine according to claim 19, wherein said processor operates said graphical display to display the first contribution pattern and the benchmark pattern in an overlapping manner.

* * * * *